(12) United States Patent
Yabuhara et al.

(10) Patent No.: US 6,521,689 B1
(45) Date of Patent: Feb. 18, 2003

(54) FLAME-RETARDANT AROMATIC POLYAMIDE RESIN COMPOSITION AND MOLDED OBJECT

(75) Inventors: Tadao Yabuhara, Tokushima (JP); Yuji Tada, Tokushima (JP); Shinji Nakano, Tokushima (JP); Takashi Kameshima, Tokushima (JP); Yoichi Nishioka, Tokushima (JP); Hiroyuki Takase, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 09/889,011

(22) PCT Filed: Nov. 7, 2000

(86) PCT No.: PCT/JP00/07812

§ 371 (c)(1),
(2), (4) Date: Jul. 6, 2001

(87) PCT Pub. No.: WO01/34704

PCT Pub. Date: May 17, 2001

(30) Foreign Application Priority Data

Nov. 9, 1999 (JP) .................................... 11-317880

(51) Int. Cl.$^7$ ............ C08K 5/35; C08K 5/49; C08K 3/10; C08K 3/18; C08K 3/22
(52) U.S. Cl. ............ 524/436; 524/95; 524/116; 524/119; 524/122; 524/413; 524/433; 524/436; 524/437; 524/432; 524/443; 524/444; 524/494
(58) Field of Search ............ 524/95, 119, 116, 524/122, 436, 413, 432, 433, 444, 443, 437, 494

(56) References Cited

U.S. PATENT DOCUMENTS

| | | | | |
|---|---|---|---|---|
| 3,996,312 A | * | 12/1976 | Kolich et al. | ................ 528/168 |
| 4,094,856 A | | 6/1978 | Randolph | |
| 4,550,177 A | * | 10/1985 | Kumar et al. | ................ 548/413 |
| 6,146,557 A | * | 11/2000 | Inata et al. | ................ 252/609 |

FOREIGN PATENT DOCUMENTS

| | | |
|---|---|---|
| EP | 0 881 264 A2 | 12/1998 |
| WO | WO 00/09518 | 2/2000 |

* cited by examiner

*Primary Examiner*—Kriellion A. Sanders
(74) *Attorney, Agent, or Firm*—Knobbe, Martens, Olson & Bear LLP

(57) ABSTRACT

An object of this invention is to impart excellent flame retardancy to an aromatic polyamide resin without use of a halogen compound which is responsible for generation of gases harmful to the human body and without decreasing preferred properties (e.g. mechanical properties, and molding processability) inherently possessed by aromatic polyamide resins, the flame-retardant aromatic polyamide resin composition of this invention comprising (a) 100 parts by weight of an aromatic polyamide resin, (b) 0.1 to 100 parts by weight of a crosslinked phosphazene compound which is a compound crosslinked with a crosslinking group, such as phenylene groups, the crosslinking group being interposed between the two oxygen atoms left after the elimination of phenyl groups from the phosphazene compound, no free hydroxyl group being present in the molecule, the amount of all phenyl groups in the crosslinked compound being 50 to 99.9% based on the total amount of the phenyl groups in the phosphazene compounds, (c) 1 to 60 parts by weight of an inorganic fibrous substance and (d) 1 to 60 parts by weight of magnesium hydroxide.

10 Claims, No Drawings

FLAME-RETARDANT AROMATIC POLYAMIDE RESIN COMPOSITION AND MOLDED OBJECT

FIELD OF THE INVENTION

The present invention relates to a flame-retardant aromatic polyamide resin composition and moldings.

BACKGROUND ART

Aromatic polyamide resins are excellent in heat resistance, mechanical properties, molding processability, chemical resistance and the like and are widely used for automotive parts, electric and electronic parts, machine parts, etc. When aromatic polyamide resins are used in these applications, a flame retardant needs to be added to the aromatic polyamide resin in order to impart flame retardancy to the resin for prevention of ignition due to the generation of heat. Especially, when these resins are used for electric and electronic parts, the resins are required to have a flame retardancy as high as V-0 (a level of flame retardancy at which combustion does not continue for longer than a specific period of time and there occurs no dripping of molten resin which ignites cotton) according to UL Standard (Underwriters Laboratories, Inc., Standard for Tests for Flammability of Plastics Materials).

Various flame-retardant aromatic polyamide resin compositions comprising an aromatic polyamide resin and a flame retardant have been proposed and include, for example, a composition comprising an aromatic polyamide resin, brominated polystyrene and antimony oxide (Japanese Unexamined Patent Publications Nos. 263985/1994 and 263986/1994); a composition comprising an aromatic polyamide resin, brominated polystyrene, magnesium hydroxide and the like (Japanese Unexamined Patent Publication No. 196875/1995); a composition comprising an aromatic polyamide resin and a halogen-substituted phosphazene compound (Japanese Unexamined Patent Publications Nos. 133470/1974 and 132149/1974), etc.

However, the halogen compound which is incorporated as the flame retardant into these compositions thermally decomposes during molding of resins, and generates hydrogen halide, unavoidably resulting in corrosion of molds, and in degradation and discoloration of the resin. When resin moldings are burned by a fire or the like, hydrogen halide and the like raise another problem of giving off gases and smoke which are harmful to organisms.

On the other hand, flame-retardant aromatic polyamide resin compositions which do not contain a halogen compound are known and include, for example, a composition comprising an aromatic polyamide resin, an inorganic filler, red phosphorus, melamine cyanurate and the like (Japanese Unexamined Patent Publication No. 161848/1980); a composition comprising an aromatic polyamide resin, a phenolic resin, an aldehyde resin, red phosphorus, a filler and the like (Japanese Unexamined Patent Publications Nos. 25956/1979 and 80357/1979) and so on.

However, these compositions entail a problem that because of red phosphorus present therein, the moldings produced from the composition are inevitably markedly colored and are difficult to use for the above-mentioned purposes. Japanese Unexamined Patent Publication Nos. 183864/1997 discloses a composition comprising an aromatic polyamide resin, a phosphorylamide compound, cyanuric acid and the like. The disclosed composition, although free of both the halogen compound and red phosphorus, gives molded products which are unsatisfactory in flame retardancy and mechanical properties.

Halogen-free phosphate compounds are widely used as a flame retardant for thermoplastic resins. Various flame-retardant resin compositions containing such phosphate compound are proposed. Known as halogen-free phosphate compounds are, for example, resorcinol-bis(diphenyl phosphate), hydroquinone-bis(diphenyl phosphate), bisphenol-A-bis(diphenyl phosphate), bisphenol-S-bis(diphenyl phosphate), resorcinol-bis(dixylyl phosphate), hydroquinone-bis(dixylyl phosphate), bisphenol-A-bis(ditolyl phosphate), bisphenol-A-bis(dixylyl phosphate), bisphenol-S-bis(dixylyl phosphate), etc. However, the resin compositions containing these phosphate compounds can not sufficiently prevent dripping of molten resin when moldings of the composition are burned. Consequently even if these phosphate compounds are incorporated into a resin composition, it is impossible to obtain a flame-retardant composition and moldings which have flame retardancy as high as V-0 in UL Standard.

Furthermore, known as a flame retardant is a crosslinked phosphazene compound (Japanese Unexamined Patent Publication No. 181429/1999) in which at least one phosphazene compound selected from the group consisting of a cyclic phenoxyphosphazene compound represented by the formula (1)

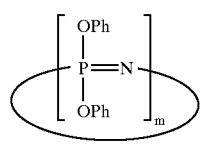

(1)

wherein m is an integer of 3 to 25 and Ph is a phenyl group and a linear phenoxyphosphazene compound represented by the formula (2)

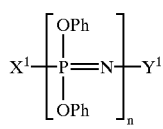

(2)

wherein $X^1$ represents a group —N=P(OPh)$_3$ or a group —N=P(O)OPh, $Y^1$ represents a group —P(OPh)$_4$ or a group —P(O)(OPh)$_2$, n is an integer of 3 to 10000 and Ph is as defined above
is/are crosslinked with at least one crosslinking group selected from the class consisting of o-phenylene group, m-phenylene group, p-phenylene group and bisphenylene group represented by the formula (3)

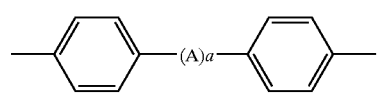

(3)

wherein A is —C(CH$_3$)$_2$—, —SO$_2$—, —S— or —O— and a is 0 or 1;
wherein
  (i) each of the crosslinking groups is interposed between the two oxygen atoms left after the elimination of phenyl groups from the phosphazene compound; and
  (ii) the amount of the phenyl groups in the crosslinked compound is 50 to 99.9% based on the total amount of the phenyl groups in the phosphazene compound represented by the formula (1) and/or the phosphazene compound represented by the formula (2). The foregoing crosslinked phosphazene compound has a free hydroxyl group(s) in the molecule. The process for preparing the crosslinked phosphazene compound which is disclosed in Publication No. 181429/1999 gives a crosslinked phosphazene compound in which a hydroxyl group(s) is/are unavoidably left, the hydroxyl group(s) being derived from an alkali metal salt of aromatic dihydroxy compound used as the raw material. The reason therefor is as follows.

According to the research by the present inventors, it was found that the alkali metal salt of aromatic dihydroxy compound shows an exceedingly lower reactivity in a reaction with the dichlorophosphazene compound than the alkali metal salt of phenol. Stated more specifically, when a dichlorophosphazene compound is mixed with an alkali metal salt of phenol with heating, there is produced a phenoxyphosphazene in which the chlorine atom is substituted with a phenoxy group. On the other hand, when a dichlorophosphazene compound is mixed with an alkali metal salt of aromatic dihydroxy compound with heating, substantially no reaction occurs in which the chlorine atom is substituted with a phenoxy group.

Consequently, according to the process disclosed in Japanese Unexamined Patent Publication No. 181429/1999 (in which a dichlorophosphazene compound is reacted with an alkali metal salt of phenol and an alkali metal salt of aromatic dihydroxy compound), a great difficulty is entailed in completely substituting the chlorine atom in the dichlorophosphazene compound with two OM groups (M=alkali metal) of the alkali metal salt of aromatic dihydroxy compound. Accordingly the OM groups remaining unreacted with the chlorine atom are converted into OH groups, with the result that a phenoxyphosphazene compound having a hydroxyl group is produced.

The crosslinked phosphazene compound disclosed in Japanese Unexamined Patent Publication No. 181429/1999 has the following defect as the flame retardant due to free hydroxyl groups in the molecule.

When a resin composition prepared by incorporating the crosslinked phosphazene compound disclosed in Japanese Unexamined Patent Publication No. 181429/1999 into a resin is stored for a prolonged period of time, the moldings molded from the composition exhibit a low flame retardancy and impaired mechanical properties.

DISCLOSURE OF THE INVENTION

An object of the present invention is to provide a flame-retardant aromatic polyamide resin composition which is free of a halogen compound so that no hydrogen halide is generated due to heat decomposition of halogen compound and which would not cause corrosion of molds or degradation and discoloration of the resin.

Another object of the invention is to provide a flame-retardant aromatic polyamide resin composition whose moldings would not give off gases or smoke of halogen halide harmful to organisms when burned in a fire or the like.

A further object of the invention is to provide a flame-retardant aromatic polyamide resin composition and moldings which have excellent flame retardancy corresponding to V-0 in UL Standard.

A still further object of the invention is to provide flame-retardant aromatic polyamide resin moldings which would not drip a molten resin or would prevent dripping of molten resin when the flame-retardant aromatic polyamide resin moldings are burned.

An additional object of the invention is to provide flame-retardant aromatic polyamide resin moldings which the inherent desirable characteristics such as mechanical properties and molding processability possessed by aromatic polyamide resin are not impaired but retained as they are.

A further additional object of the invention is to provide flame-retardant aromatic polyamide resin moldings which are molded from an aromatic polyamide resin composition capable of imparting excellent flame retardancy and mechanical properties to the moldings even when the composition is stored for a long time.

The present inventor conducted extensive research to achieve the foregoing objects and found that the desired flame-retardant aromatic polyamide resin composition can be produced by adding a specific compound shown below in a predetermined proportion to an aromatic polyamide resin. The present invention was completed based on such finding.

According to the invention, there is provided a flame-retardant aromatic polyamide resin composition comprising (a) 100 parts by weight of an aromatic polyamide resin, (b) 0.1 to 100 parts by weight of a crosslinked phosphazene compound, (c) 1 to 60 parts by weight of an inorganic fibrous substance and 1 to 60 parts by weight of magnesium hydroxide, the crosslinked phosphazene compound (b) being at least one phosphazene compound selected from the group consisting of a cyclic phenoxyphosphazene compound represented by the formula (1)

(1)

wherein m is an integer of 3 to 25 and Ph is a phenyl group and a linear phenoxyphosphazene compound represented by the formula (2)

(2)

wherein $X^1$ represents a group —N=P(OPh)$_3$ or a group —N=P(O)OPh, $Y^1$ represents a group —P(OPh)$_4$ or a group —P(O)(OPh)$_2$, n is an integer of 3 to 10000 and Ph is as defined above, said at least one phosphazene compound being crosslinked with at least one crosslinking group selected from the class consisting of o-phenylene group, m-phenylene group, p-phenylene group and bisphenylene group represented by the formula (3)

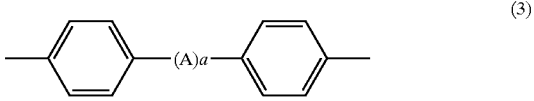

(3)

wherein A is —C(CH$_3$)$_2$—, —SO$_2$—, —S— or —O— and a is 0 or 1;

wherein
(i) each of the crosslinking groups is interposed between the two oxygen atoms left after the elimination of phenyl groups from the phosphazene compound;
(ii) the amount of the phenyl groups in the crosslinked compound is 50 to 99.9% based on the total amount of all phenyl groups in the phenoxyphosphazene compound represented by the formula (1) and/or the phenoxyphosphazene compound represented by the formula (2); and
(iii) the crosslinked phosphazene compound has no free hydroxyl group in the molecule.

According to the invention, there are provided flame-retardant aromatic polyamide resin moldings which can be molded from the foregoing flame-retardant polyamide resin composition.

The flame-retardant aromatic polyamide resin composition of the invention comprises as the essential components an aromatic polyamide resin, a specified crosslinked phosphazene compound, an inorganic fibrous substance and magnesium hydroxide.

Aromatic Polyamide Resin

Aromatic polyamide resins useful in this invention are not limited insofar as they are those containing in the main chain, as repeating units, a group comprising bivalent residue selected from bivalent aromatic cyclic residues and bivalent heterocyclic residues bonded to amide residue (—CONH—). Any of conventional ones can be used.

Examples of bivalent aromatic residues are phenylene, alkylene phenylene, dialkylene phenylene, biphenylene, a group represented by the formula

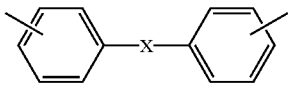

wherein X is alkylene group having 1 to 5 carbon atoms, oxygen atom, sulfur atom, a group —CO— or a group —SO$_2$—, naphthalene group and so on. Examples of bivalent heterocyclic residues are bivalent thiazole residues, bivalent benzoimidazole residues, etc.

One or more groups such as nitro, hydroxy, carboxy and alkoxy may be present as the substituent on the aromatic ring or heterocyclic ring of bivalent residues. The number of these substituents are not limited. For example, phenylene group may have 1 to 4 substituents, biphenylene group 1 to 8 substituents, naphthalene group 1 to 6 substituents, bivalent thiazole residue one substituent, and bivalent benzoimidazole residue have 1 to 4 substituents.

Examples of aromatic polyamide resins containing in the main chain, as repeating units, a group comprising bivalent aromatic cyclic residue bonded to amide residue are polyamide MXD6 resins, modified nylon 6T resins, polyphenylene isophthalamide, polyphenylene terephthalamide, polybenzamide, polyamideimide, polyamide ester, polyamide-hydrazide, polysulfonamide, polyamideimide ester, etc.

Example of the aromatic polyamide resin containing in the main chain, as repeating units, a group comprising bivalent heterocyclic residue bonded to amide residue are polyamidebenzimidazole, polythiazoleamide, etc.

Among these aromatic polyamide resins, it is preferred to use those containing in the main chain, as repeating units, a group comprising bivalent aromatic residue bonded to amide residue. Preferred examples include aromatic polyamide resins containing in the main chain, as repeating units, a group formed by the reaction of terephthalic acid, isophthalic acid or like dibasic acid with a diamine such as hexamethylenediamine, 4,4'-diaminodiphenylmethane, p-phenylenediamine, m-phenylenediamine or the like, or a group formed by the reaction of adipic acid, sebacic acid or like dibasic acids with a diamine such as 4,4'-diaminodiphenylmethane, p-phenylenediamine, m-phenylenediamine or the like.

Aromatic polyamide resins may be those containing, as the bond unit, —CO—, —OCO—, —SO$_2$—, —NH—CO—CO—NH— and —CH$_2$— in addition to —CONH—. Preferred aromatic polyamide resins include those containing —CONH— in an amount of 10 mole % or more of the total of these bond units.

Aromatic polyamide resins to be used in the invention can be easily prepared by the processes disclosed in numerous known publications including, for example, "Takayuki OHTSU, Masaetsu KINOSHITA; Koubunshi Gosei no Jikkenhou (Methods of Preparing Polymers), Kagaku-Dojin Publishing Co., Ltd., published on Mar. 15, 1988", pp.309 to 330; "Juushukugou to Juufuka (Polycondensation and Polyaddition), edited by editing committee for polymer experimentation by Polymer Society, Kyoritsu Shuppan Co., Ltd. published on Aug. 15, 1980", pp. 83 to 103; "$_4$th Edition, Jikken Kagaku Kouza (Experimental Chemistry Lecture), Vol.28, edited by The Chemical Society of Japan, published by Maruzen Co., Ltd., on May 6, 1992", pp.252 to 287; Japanese Examined Patent Publications Nos. 14399/1960, 13247/1960, 10863/1972, 15637/1967, etc.

In the invention, other resins can be mixed with the aromatic polyamide resin. Specific examples of such resins are aliphatic polyamides such as polyamide 6, polyamide 6, 6, polyamide 6, 12, polyamide 4, 6 and the like, polyethylene, polypropylene, polyisoprene, polybutadiene and like polyolefins, modified polyolefin, acrylonitrile-butadiene-styrene resins, acrylonitrile-styrene resins, styrene-maleinic acid copolymers, styrene-maleinic acid-acrylonitrile copolymers, polyphenylene ether, modified polyphenylene ether, polyarylate, polycarbonate, liquid crystal polymer, polytetrafluoroethylene, etc. There is no limitation on the proportions of the aromatic polyamide resin and other resins. The proportions thereof can be properly selected depending on various conditions such as compatibility of the resin with aromatic polyamide resins, the purpose of the resin composition obtained by mixing the resins, etc. Usually the other resin is used in an amount of 200 parts by weight or less, preferably 100 parts by weight or less, more preferably 50 parts by weight or less, per 100 parts by weight of the aromatic polyamide resin.

Crosslinked Phosphazene Compound

The crosslinked phosphazene compound of the invention is a compound prepared by crosslinking at least one species of phosphazene compound selected from the group consisting of the cyclic phenoxyphosphazene of the formula (1) and the linear phenoxyphosphazene compound of the formula (2) with at least one species of crosslinking group selected from the class consisting of o-phenylene group, m-phenylene group, p-phenylene group and bisphenylene group of the formula (3),
wherein
(i) each of the crosslinking groups is interposed between the two oxygen atoms left after the elimination of phenyl groups from the phosphazene compound;
(ii) the amount of the phenyl groups in the crosslinked compound is 50 to 99.9% based on the total amount of all phenyl groups in the phosphazene compound represented by the formula (1) and/or phosphazene compound represented by the formula (2); and (iii) the crosslinked phenoxyphosphazene compound has no free hydroxyl groups in the molecule.

The crosslinked phenoxyphosphazene compound is characterized by the above features (i) to (iii) so that it can give higher flame retardancy to the aromatic polyamide resin than conventional phenoxyphosphzene compounds.

Among the above-mentioned crosslinked phenoxyphosphazene compounds, it is preferred to use the cyclic phenoxyphosphazene of the formula (1) wherein m is 3 to 8 and/or the linear phenoxyphosphazene compound of the formula (2) wherein n is an integer of 1000 to 5000 which is crosslinked with the foregoing crosslinking group represented by the formula (3), wherein a is 1, and A is at least one species selected from the class consisting of a group —C(CH$_3$)$_2$, a group —SO$_2$— and a group —S—.

The foregoing crosslinked phenoxyphosphazene compound can be prepared, for example, by reacting at least one species of dichlorophosphazene compound selected from the group consisting of a cyclic dichlorophosphazene represented by the formula (4)

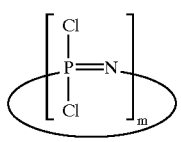

(4)

wherein m is as defined above, and a linear dichlorophosphazene represented by the formula (5)

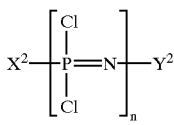

(5)

wherein X$^2$ represents a group —N=PCl$_3$ or a group —N=P(O)Cl, Y$^2$ represents a group —PCl$_4$ or a group —P(O)Cl$_2$ and n is as defined above with a mixture of an alkali metal phenolate represented by the formula (6)

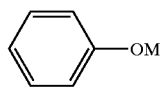

(6)

wherein M is an alkali metal and at least one diphenolate selected from the group consisting of an alkali metal diphenolate represented by the formula (7)

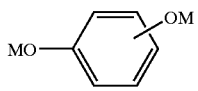

(7)

wherein M is as defined above and an alkali metal diphenolate represented by the formula (8)

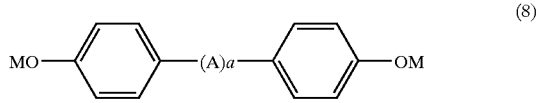

(8)

wherein A, a and M are as defined above (first step) and then reacting the above-obtained compound with the foregoing alkali metal phenolate (second step).

The dichlorophosphazene compounds of the formulas (4) and (5) to be used as the raw materials in the foregoing producing process can be produced according to known processes disclosed in, for example, Japanese Unexamined Patent Publication No. 87427/1982, and Japanese Examined Patent Publications Nos. 19604/1983, 1363/1986, and 20124/1987, etc. An example of the processes comprises reacting ammonium chloride and phosphorus pentachloride (or ammonium chloride, phosphorus trichloride and chlorine) at a temperature of about 120 to about 130° C. to remove hydrochloric acid.

The alkali metal phenolate represented by the formula (6) can be selected from a wide variety of conventional compounds and includes, for example, sodium phenolate, potassium phenolate, lithium phenolate and the like. These alkali metal phonolates can be used either alone or in combination.

In the alkali metal diphenolate of the formula (7), two OM groups (M is as defined above) may be in any position relation among ortho- , meta- and para- . Specific examples of the foregoing alkali metal diphenolate are alkali metal salts of resorcinol, hydroquinone or catechol and the like. Among them, sodium salt and lithium salt are preferable. The alkali metal diphenolates can be used either alone or in combination.

Examples of the alkali metal diphnenolate of the formula (8) are alkali metal salts of 4,4'-isopropylidene diphenol (bisphenol-A), 4,4'-sulfonyldiphenol(bisphenol—S), 4,4'-thiodiphenol, 4,4'-oxydiphenol or 4,4'-diphenol and the like. Among them, sodium salt and lithium salt are preferable. These alkali metal diphenolates can be used either alone or in combination.

In the invention, the alkali metal diphenolate of the formula (7) and the alkali metal diphenolate of the formula (8) can be used either alone or at least two of them may be used in admixture.

In the first step of the foregoing process, it is desirable to adjust the amounts of the alkali metal phenolate and alkali metal diphenolate to ensure that the chlorine atom in the dichlorophosphazene compound is not completely consumed in the reaction with the alkali metal phenolate and alkali metal diphenolate, namely the chlorine atom in the dichlorophosphazene compound still remains after completion of the reaction with the alkali metal phenolate and alkali metal diphenolate. Thereby the two OM groups (M is as defined above) of the alkali metal diphenolate is bonded to the phosphorus atom of dichlorophosphazene compound. The amounts of the alkali metal phenolate and alkali metal diphenolate used in the first step are such that a total amount of the two compounds is about 0.05 to about 0.9 equivalent, preferably about 0.1 to about 0.8 equivalent, based on the amount of chlorine atom of the dichlorophosphazene compound.

In the second step of the foregoing process, it is desirable to adjust the amount of the alkali metal phenolate to ensure that the chlorine atom in the compound produced in the first step and free hydroxyl groups are completely consumed by the reaction with the alkali metal phenolate. In the present invention, the amount of the alkali metal phenolate to be used is about 1 to about 1.5 equivalents, preferably about 1 to about 1.2 equivalents, based on the amount of chlorine atom of the dichlorophosphazene compound.

In the invention, the proportions of the alkali metal phenolate (combined amounts used in the first and second steps) and alkali metal diphenolate (alkali metal diphenolate/ alkali metal phenolate, mole ratio) are in the range of from about 1/2000 to about 1/4, preferably from about 1/20 to about 1/6.

The reactions in the first and second steps are conducted at a temperature ranging from room temperature to about 150° C., preferably about 80 to about 140° C., and are completed in about 1 to about 12 hours, preferably about 3 to about 7 hours. The reactions in the first and second steps are conducted in an organic solvent such as benzene, toluene, xylene or like aromatic hydrocarbons, monochlorobenzene, dichlorobenzene, and like halogenated aromatic hydrocarbons.

According to the invention, a dichloro-phosphazene compound is reacted with a mixture of alkali metal phenolate and alkali metal diphenolate (first step) and the obtained compound is reacted with an alkali metal phenolate (second step). The above-mentioned specific process gives a crosslinked phenoxyphosphazene compound wherein no free hydroxyl group is left in the molecule, M is removed from the two OM groups of alkali metal diphenolate and the two oxygen atoms are bonded to phosphorus atoms in the dichlororphosphazene compound.

The crosslinked phenoxyphosphazene compound prepared by the foregoing reaction can be easily isolated and purified from the reaction mixture by usual isolation methods such as washing, filtration, drying or the like.

The crosslinked phenoxyphosphazene compound has a decomposition temperature in the range of 250 to 400° C.

The amount of the phenyl groups in the crosslinked phenoxyphosphazene compound is 50 to 99.9%, preferably 70 to 90%, based on the total amount of the phenyl groups in the cyclic phenoxyphosphazene compound represented by the formula (1) and/or chain-like phenoxyphosphazene compound represented by the formula (2).

In the formula (2), terminal groups $X^1$ and $Y^1$ may vary depending on the reaction conditions. When the reaction is carried out under ordinary conditions, e.g. when a mild reaction is conducted in a nonaqueous system, the compound has a structure wherein $X^1$ is —N=P(OPh)$_3$ and $Y^1$ is —P(OPh)$_4$. If the reaction is performed under such a condition that moisture or an alkali metal hydroxide is present in the reaction system or under a severe condition such that a rearrangement reaction takes place, the compound having a structure wherein $X^1$ is —N=P(O)OPh, and $Y^1$ is —P(O)(OPh)$_2$ exists as mixed with the above compound.

The resin composition of the invention contains the phosphazene compound in an amount of 0.1 to 100 parts by weight, preferably 1 to 40 parts by weight, per 100 parts by weight of the aromatic polyamide resin. If the amount is less than 0.1 part by weight, the phosphazene compound may fail to give the aromatic polyamide resin flame retardancy corresponding to V-0 in UL Standard. On the other hand, if more than 100 parts by weight is used, the flame retardancy is not enhanced and deteriorated mechanical properties may be imparted to the moldings.

Inorganic Fibrous Substance

Inorganic fibrous substances to be used in the invention are not limited insofar as they are inorganic materials in the form of fibers, and such substances include a wide variety of conventional ones. Specific examples of useful inorganic fibrous substances are fibrous alkali metal titanate, fibrous transition metal borate, fibrous alkaline earth metal borate, fibrous zinc oxide (Japanese Examined Patent Publications Nos. 5529/1985 and 51657/1991, etc.), fibrous titanium oxide, fibrous magnesium oxide (Japanese Unexamined Patent Publications Nos. 11223/1985 and 210000/1986, etc.), fibrous gypsum (Japanese Examined Patent Publications Nos. 12235/1983 and 34410/1983, etc.), fibrous aluminum silicate (Japanese Examined Patent Publications Nos. 76956/1992 and 96480/1995, etc.), fibrous calcium silicate (Japanese Unexamined Patent Publications Nos. 319199/1996 and 40840/1997, etc.), fibrous silicon carbide (Japanese Unexamined Patent Publication No. 109811/1981, Japanese Examined Patent Publication No. 4999/1989, etc.), fibrous titanium carbide (Japanese Examined Patent Publication Nos. 45638/1984 and Japanese Unexamined Patent Publication No. 250225/1987, etc.), fibrous silicon nitride (Japanese Unexamined Patent Publication Nos. 17499/1982 and 17500/1982), fibrous titanium nitride (Japanese Unexamined Patent Publications Nos. 221198/1990 and 173000/1995), carbon fibers, alumina fibers, alumina-silica fibers, zirconia fibers, glass fibers, quartz fibers, etc.

Among these inorganic fibrous substances, it is desirable to use those having a shape anisotropy. Examples of such inorganic fibrous substances are fibrous alkali metal titanate, fibrous transition metal borate, fibrous alkaline earth metal borate, fibrous zinc oxide, fibrous titanium oxide, fibrous magnesium oxide, fibrous gypsum, fibrous aluminum silicate, fibrous calcium silicate, fibrous silicon carbide, fibrous titanium carbide, fibrous silicon nitride, fibrous titanium nitride and like inorganic fibrous substances having a shape anisotropy. Among them, particularly preferred are fibrous alkali metal titanate, fibrous transition metal borate, fibrous alkaline earth metal borate, fibrous titanium oxide, fibrous calcium silicate and like inorganic fibrous substances having a shape anisotropy. Among these inorganic fibrous substances, it is especially desirable to use those having an average fiber diameter of about 0.05 to about 2.0 μm, an average fiber length of about 1 to about 500 μm, and an aspect ratio (fiber length/fiber diameter) of 5 or more, preferably 10 or more.

Among these inorganic fibrous substances, it is preferred to use an inorganic fibrous substance having a pH of 6.0 to 9.5. The pH of the inorganic fibrous substance referred to herein is a pH value as determined at 20° C. after stirring a suspension of 1.0 wt. % of inorganic fibrous substance (in deionized water) for 10 minutes. If the pH is significantly more than 9.5, this may deteriorate the properties of aromatic polyamide resin and may lower resistance to heat discoloration. Hence it is undesirable. On the other hand, a pH of far below 6.0 not only reduces the effect of enhancing the strength of the obtained resin composition, but also is responsible for corrosion of processing machine and mold which would occur due to the remaining acid.

These inorganic fibrous substances can be used either alone or in combination.

The amount of the inorganic fibrous substance in the composition of the invention is 1 to 60 parts by weight, preferably 5 to 40 parts by weight, per 100 parts by weight of the aromatic polyamide resin. If less than 1 part by weight is used, the effect of preventing dripping of molten resin is unsatisfactory, whereas more than 60 parts by weight decreases the relative concentration of the phosphazene compound serving as the flame retardant, decreasing the flame retardancy of the obtained resin composition.

Magnesium Hydroxide

In the invention, magnesium hydroxide prevents dripping of molten resin due to the synergistic effect achieved by its combined use with the crosslinked phosphazene compound and the inorganic fibrous substance when the resin moldings are burned.

The magnesium hydroxide to be used herein can be any of commercial products and synthesized products. Preferred magnesium hydroxide is one which contains 0.01 to 1 wt % of volatiles when heated at 120° C. for 1 hour and which has an average particle size of 0.1 to 100 $\mu$m, and a specific surface area (BET (Brunauer-Emmett-Teller) method) of 0.1 to 500 m$^2$/g. Among these magnesium hydroxide compounds, more preferred are those which contain 0.05 to 0.5 wt % of the foregoing volatiles and which has an average particle size of 0.5 to 30 $\mu$m, and a specific surface area of 1 to 20 m$^2$/g. The average particle size was measured by CAPA-300 (Horiba/Nature centrifugal sedimentation type automatic particle size distribution measuring device, product of Horiba Seisakusho Co., Ltd.). If the volatile content is less than 0.01 wt. %, magnesium oxide is produced as a by-product, resulting in a likelihood of reducing the flame retardancy. On the other hand, if the volatile content markedly exceeds 1 wt. %, the volatiles may decrease the mechanical properties of the resin in kneading the resin with magnesium hydroxide. When the average particle size is less than 0.1 $\mu$m, or when the specific surface area is less than 0.1 m$^2$/g, it is difficult to handle the magnesium hydroxide. When the average particle size is more than 100 $\mu$m, or when the specific surface area is more than 500 m$^2$/g, it is difficult to fully disperse the components in kneading the resin with magnesium hydroxide, making it difficult to give sufficient flame retardancy to the obtained composition.

The magnesium hydroxide particles may be coated with fatty acid, fatty acid salt, silicon compound, epoxy compound or the like. Examples of the fatty acid are laurie acid, myristic acid, palmitic acid, stearic acid, etc. Examples of the fatty acid salt are salts of the above-exemplified fatty acid with sodium, potassium, magnesium, calcium, barium or like alkali metals or alkaline earth metals. Examples of the silicon compound are vinyl tris($\beta$-methoxyethoxy) silane, vinyltriethoxysilane, vinyltrimethoxysilane, $\gamma$-(methacryloyloxypropyl)trimethoxysilane, $\gamma$-aminopropyltriethoxysilane, etc. Examples of the epoxy compound are $\beta$-(3,4-epoxycyclohexyl) ethyltrimethylsilane, $\gamma$-glycidoxypropyltrimethoxysilane, etc.

The magnesium hydroxide particles can be coated by conventional methods. For example, the fatty acid or the like is dissolved in an organic solvent such as methanol, isopropyl alcohol, acetone or the like. Then, magnesium hydroxide is added to the solution, and the mixture is stirred, mixed, filtered, washed and dried in a hot air dryer. The magnesium hydroxide particles may be either partly or entirely coated, but preferably entirely coated.

The magnesium hydroxide for use herein are commercially available under the trade names "KISUMA 120, 5A, 5B, 5E, and 5J" from Kyowa Kagaku Kogyo Co., Ltd.), and under the trade names "Magnesium Hydroxide 1, 2A and 2B" from Umai Kasei Kogyo Co., Ltd., etc.

The amount of magnesium hydroxide in the resin composition of the invention is 1 to 60 parts by weight, preferably about 5 to 40 parts by weight, per 100 parts by weight of the aromatic polyamide resin. The use of magnesium hydroxide in an amount of less than 1 part by weight produces insufficient effect of preventing dripping of molten resin when the resin molding is burned. If the amount is more than 60 parts by weight, the mechanical properties of the resin moldings are decreased.

Other Additives

The flame-retardant aromatic polyamide resin composition of the present invention may contain inorganic fillers conventionally used in the field of flame-retardant resins within the range which does not impair the preferred characteristics. Examples of such inorganic fillers are aluminum hydroxide, magnesium sulfate, calcium sulfate, barium sulfate, aluminum sulfate, aluminum ammonium sulfate, aluminum potassium sulfate, aluminum sodium sulfate, magnesium carbonate, calcium carbonate, aluminum phosphate, ammonium phosphate, etc. These inorganic fillers can be used either alone or in combination.

Additionally, the flame-retardant aromatic polyamide resin composition of the present invention may contain various additives (other than inorganic fillers) conventionally used in the field of flame-retardant resins within the range which does not decrease the preferred characteristics. Examples of such additives are flame retardants other than crosslinked phosphazene compounds, UV absorbers, light stabilizers, antioxidants, light screens, metal deactivators, light quencher, heat resistance stabilizers, lubricants, mold releasing agents, coloring agents, antistatic agents, antiaging agents, plasticizers, impact strength improving agents, other fillers than the above fillers and compatibilizers. These additives can be used either alone or in combination.

Production of Flame-retardant Aromatic Polyamide Resin Compositions

The flame-retardant aromatic polyamide resin composition of the invention can be prepared by mixing or kneading the above-mentioned essential components and optionally other additives according to conventional processes. For example, an aromatic polyamide resin is melted by a single-screw extruder, a twin-screw extruder or like extruders, Banbury mixer, a pressure kneader, or a twin-roll kneader or like kneaders, and a crosslinked phosphazene compound, an inorganic fibrous substance, magnesium hydroxide, and optionally other additives are added and kneaded. Alternatively, the aromatic polyamide resin, an inorganic fibrous substance, magnesium hydroxide and optionally other additives are dry-blended, and the obtained mixture is mixed and melted by the extruder, the kneader or the like, and to the mixture a crosslinked phosphazene compound is added and kneaded.

Production of Flame-retardant Aromatic Polyamide Resin Moldings

The flame-retardant aromatic polyamide resin composition of the invention can be molded into flame-retardant resin moldings. For example, the resin composition can be molded into resin plates, sheets, films, special shape products or like moldings of various shapes by, for example, injection molding, extrusion molding (including sheet extrusion molding, and special shape extrusion molding), vacuum molding, blow molding, foaming, injection press moldinGoodas injection molding or like conventional molding means, and also can be molded into a resin plate of two- or three-layered structure using a coextruding kneader.

Use of Flame-retardant Aromatic Polyamide Resin Composition and Moldings

The thus-obtained flame-retardant resin composition and flame-retardant resin moldings of the invention can be used in various industrial fields such as electrical, electronic or telecommunication, agriculture, forestry, fishery, mining, construction, foods, fibers, clothings, medical services, coal, petroleum, rubber, leathers, automobiles, precision machinery, timber, furniture, printing, musical instruments and the like.

Stated more specifically, the flame-retardant resin composition and flame-retardant resin moldings of the invention can be used for business or office automation equipment such as printers, personal computers, word processors, keyboards, PDA (personal digital assistants), telephones, facsimile machines, copying machines, ECR (electronic cash registers), desk-top electronic calculators, electronic databooks, electronic dictionaries, cards, holders and stationery; electrical household appliances and electrical equipment such as washing machines, refrigerators, cleaners, microwave ovens, lighting equipment, game machines, irons and kotatsu (low, covered table with a heat source underneath); audio-visual equipment such as TV sets, VTR, video cameras, radio casette recorders, tape recorders, mini discs, CD players, MD players, speakers and liquid crystal displays; and electric or electronic parts and telecommunication equipment such as connectors, relays, condensers, switches, printed circuit boards, coil bobbins, semiconductor sealing materials, electric wires, cables, transformers, deflecting yokes, distribution boards and clocks.

Further the flame-retardant resin composition and flame-retardant resin moldings of the invention can be widely used in the following applications: materials for automobiles, vehicles, ships, aircraft and construction such as seats (e.g. paddings, outer materials, etc.), belts, ceiling coverings, convertible tops, arm rests, door trims, rear package trays, carpets, mats, sun visors, wheel covers, mattress covers, air bags, insulation materials, hangers, hand straps, electric wire coating materials, electrical insulating materials, paints, coating materials, overlaying materials, floor materials, corner walls, deck panels, covers, plywood, ceiling boards, partition plates, side walls, carpets, wall papers, wall decorating materials, exterior decorating materials, interior decorating materials, roofing materials, sound insulating materials, thermal insulation panels and window materials; and living necessities and sportinGoodoods such as clothing, curtains, sheets, plywood, laminated fiber boards, carpets, entrance mats, seats, buckets, hoses, containers, glasses, bags, cases, goGoodles, skies, rackets, tents and musical instruments.

BEST MODE FOR CARRYING OUT THE INVENTION

The present invention will be described below in more detail with reference to Synthesis Examples, Reference Examples, Examples, Comparative Examples and Test Example. The "parts" and "%" appearing hereinafter are all by weight. —Ph and —Ph— mean phenyl group and phenylene group, respectively.

Synthesis Example 1

Synthesis of Phenoxyphosphazene Compound Having p-phenylene-crosslinked Structure A mixture of 103.5 g (1.1 moles) of phenol, 44.0 g (1.1 moles) of sodium hydroxide, 50 g of water and 500 ml of toluene was refluxed with heating, and water alone was removed from the system, giving a solution of sodium phenolate in toluene.

In parallel with the above reaction, 16.5 g (0.15 mole) of hydroquinone, 94.1 g (1.0 mole) of phenol, 31.1 g (1.3 moles) of lithium hydroxide, 52 g of water and 600 ml of toluene were placed into a 2-liter, 4-necked flask. The mixture was refluxed with heating, and water alone was removed from the system, giving a solution of lithium salt of hydroquinone and lithium salt of phenol in toluene. 580 g of a 20% chlorobenzene solution containing 1.0 unit mole (115.9 g) of dichlorophosphazene oligomers (a mixture of 62% of trimer, 12% of tetramer, 11% of pentamer and hexamer, 3% of heptamer and 12% of octamer and higher oligomers) was added dropwise to the toluene solution at 30° C. or lower with stirring, followed by stirring at 110° C. for 3 hours. To the reaction mixture was added the above prepared toluene solution of sodium phenolate with stirring, and the reaction was continued at 110° C. for 4 hours.

After the reaction was completed, the reaction mixture was washed three times with 1.0 liter of a 3% aqueous solution of sodium hydroxide and then three times with 1.0 liter of water, and the organic layer was concentrated under reduced pressure. The obtained concentrate was subjected to vacuum drying with heating at 80° C. under a pressure of 400 Pa for 11 hours to give 211 g of crosslinked phenoxyphosphazene as a pale yellow powder.

The obtained crosslinked phenoxyphosphazene had a hydrolyzable chlorine content of 0.04%, a weight average molecular weight (Mw) of 1100 (calculated as standard polystyrene, GPC analysis), and an approximate composition

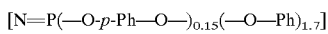

$[N=P(-O\text{-}p\text{-}Ph-O-)_{0.15}(-O-Ph)_{1.7}]$ which was determined based on the phosphorus content and CHN elemental analysis data.

The crosslinked phenoxyphosphazene obtained above did not show a definite melting point and had a decomposition starting temperature of 306° C. and a 5% weight loss temperature of 311° C. as determined by TG/DTA analysis (thermogravimetric analysis).

Further the quantity of the residual hydroxyl groups was determined by the actylation method using acetic anhydride and pyridine, the method being described in "Analysis Chemistry Handbook", (revised third edition, edited by The Japan Society for Analytical Chemistry, published by Maruzene Co., Ltd., 1981) page 353 (hereinafter referred to merely as "acetylation method"), and was found to be not larger than the detection limit ($1\times10^{-6}$ equivalents/g, as hydroxyl equivalent per gram of the sample).

Reference Example 1

Resorcinol-bis(diphenyl phosphate):

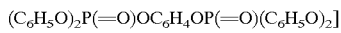

$(C_6H_5O)_2P(=O)OC_6H_4OP(=O)(C_6H_5O)_2]$ to be used in Comparative Example as a halogen-free phosphate flame retardant was prepared as follows.

A 2 liter, 4-necked flask was charged with 180.55 g (1.92 moles) of phenol, 1.4 g (0.02 mole) of magnesium chloride and 19.2 g of xylene. Then the contents of the flask were mixed with heating. When the reacting mixture reached a temperature of 120° C., 147.2 g (1.0 mole) of phosphorus oxychloride was added to the reaction mixture over a period of about 2 hours. The hydrochloric acid gas generated during the addition of phosphorus oxychloride was led to a water scrubber. After addition of phosphorus oxychloride, the reaction mixture was gradually heated to 180° C. over a period of 2 hours to complete the reaction.

To the reaction mixture were added 52.8 g (0.53 mole) of resorcin, and 1.4 g (0.01 mole) of aluminum chloride. The mixture was stirred with heating and heated gradually to 180° C. over a period of 2 hours. At the same temperature, stirring was effected for 2 hours, followed by further stirring for further 2 hours under reduced pressure of 26700 Pa to complete the reaction.

To the obtained reaction mixture were added 330 g of xylene and 33 g of 10% hydrochloric acid. The mixture was stirred to remove the remaining catalyst and washed with 99 g of a 4% aqueous solution of sodium chloride. Xylene was removed from the obtained organic layer under reduced pressure, whereby the desired compound was obtained as an oil. Yield 99.2%.

Synthesis Example 2

Synthesis of Phenoxyphosphazene Having 2,2'-bis (p-oxyphenyl)isopropyridene-crosslinked Structure 65.9 g (0.7 mole) of phenol and 500 ml of toluene were placed into a 1-liter, 4-necked flask. While maintaining the internal temperature at 25° C. with stirring, 14.9 g (0.65 gram atoms) of metallic sodium in the form of finely cut pieces was added thereto. After completion of the addition, stirring was continued for 8 hours at 77 to 113° C. until the metallic sodium was completely consumed.

In parallel with the above reaction, 57.1 g (0.25 mole) of bisphenol-A, 103.5 g (1.1 moles) of phenol and 800 ml of tetrahydrofuran (THF) were placed into a 3-liter, 4-necked flask. While maintaining the internal temperature at 25° C. with stirring, 11.1 g (1.6 gram atoms) of metallic lithium in the form of finely cut pieces was added thereto. After completion of the addition, stirring was continued for 8 hours at 61 to 68° C. until the metallic lithium was completely consumed. While maintaining the internal temperature at 20° C. or lower with stirring, 313 g of 37% chlorobenzene solution containing 1.0 unit mole (115.9 g) of dichlorophosphazene oligomer (a mixture of 75% of trimer, 17% of tetramer, 6% of pentamer and hexamer, 1% of heptamer and 1% of octamer and higher oiligomers) was added dropwise to the resulting slurry solution over 1 hour, followed by stirring at 80° C. for 2 hours. Subsequently, while maintaining the internal temperature at 20° C. with stirring, the sodium phenolate solution separately prepared was added to the reaction mixture over 1 hour, followed by stirring at 80° C. for 5 hours.

After the reaction was completed, the reaction mixture was concentrated to remove THF, and 1 liter of toluene was added. The toluene solution was washed three times with 1 liter of 2% NaOH and then three times with 1.0 liter of water. Then, the organic layer was concentrated under reduced pressure. The obtained concentrate was vacuum-dried with heating at 80° C. under a pressure of 400 Pa or less for 11 hours to give 229 g of crosslinked phenoxyphosphazene as a white powder.

The obtained crosslinked phenoxyphosphazene had a hydrolyzable chloride content of 0.07%, a weight average molecular weight (Mw) of 1130 (calculated as standard polystyrene), and an approximate composition

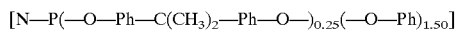

[N=P(—O—Ph—C(CH$_3$)$_2$—Ph—O—)$_{0.25}$(—O—Ph)$_{1.50}$]

which was determined based on the phosphorus content and CHN elemental analysis data.

TG/DTA analysis: The obtained crosslinked phenoxyphosphazene did not show a definite melting point, and had a decomposition starting temperature of 308° C. and a 5% weight loss temperature of 313° C. Quantity of residual hydroxyl group: Not larger than the detection limit ($1 \times 10^{-6}$ equivalents/g, as hydroxyl equivalent per gram of the sample) (acetylation method).

Synthesis Example 3

Synthesis of Phenoxyphosphazene Having 4,4'-sulfonyldiphenylene (bisphenol-S residue)-crosslinked Structure 103.5 g (1.1 moles) of phenol and 500 ml of THF were placed into a 1-liter, 4-necked flask. While maintaining the internal temperature at 25° C. with stirring, 25.3 g (1.1 gram atoms) of metallic sodium in the form of finely cut pieces was added thereto with stirring. After completion of the addition, stirring was continued for 5 hours at 65 to 72° C. until the metallic sodium was completely consumed.

In parallel with the above reaction, 94.1 g (1.0 mole) of phenol and 87.5 g (0.35 mole) of bisphenol—S were dissolved in 500 ml of THF in a 1-liter, 4-necked flask. 24.1 g (1.05 gram atoms) of metallic sodium in the form of crushed pieces was added thereto at 25° C. or lower. After completion of the addition, the temperature was elevated to 61° C. over 1 hour and stirring was continued for 6 hours at 61 to 68° C., giving a solution of sodium phenolate. The solution was added dropwise to 580 g of a 20% chlorobenzene solution containing 1.0 unit mole (115.9 g) of dichlorophosphazene oligomers (a mixture of 62% of trimer, 12% of tetramer, 11% of pentamer and hexamer, 3% of heptamer and 12% of octamer and higher oiligomers) with cooling at 25° C. or lower and stirring, followed by stirring at 71 to 73° C. for 3 hours. Then the sodium phenolate solution prepared above was added to the reaction mixture, and the reaction was continued at 71 to 73° C. for 3 hours with stirring.

After the reaction was completed, the reaction mixture was concentrated and the concentrate was dissolved again in 500 ml of chlorobenzene. The solution was washed three times with 5% aqueous NaOH, once with 5% sulfuric acid, once with 5% aqueous sodium bicarbonate and three times with water. Then the washings were concentrated to driness, giving 216 g of crosslinked phenoxyphosphazene as a pale yellow powder.

The obtained crosslinked phenoxyphosphazene had a hydrolyzable chloride content of 0.05%, a weight average molecular weight (Mw) of 1030 (calculated as standard polystyrene), and an approximate composition

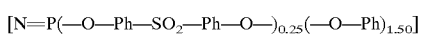

[N=P(—O—Ph—SO$_2$—Ph—O—)$_{0.25}$(—O—Ph)$_{1.50}$]

which was determined based on the phosphorus content and CHN elemental analysis data.

TG/DTA analysis; melting temperature Tm: 103° C., Decomposition starting temperature: 321° C., 5% weight loss temperature: 332° C. Quantity of residual hydroxyl groups: not larger than the detection limit ($1 \times 10^{-6}$ equivalents/g, as hydroxyl equivalent per gram of the sample) (acetylation method).

Comparative Synthesis Example 1

Synthesis of Phenoxyphosphazene Compound having p-phenylene-crosslinked Structure A phenoxyphosphazene compound having p-phenylene-crosslinked structure was prepared according to Synthesis Example 1 described in Japanese Unexamined Patent Publication No. 181429/1999.

Azeotropic dehydration was conducted to remove water from 2.04 mole (196 g) of phenol and 2.04 mole (82 g) of sodium hydroxide using toluene, giving about 1200 g of a 20% toluene solution of sodium phenolate.

In parallel with the above reaction, a 2-liter, 4-necked flask was charged with 580 g of a 20% chlorobenzene solution containing 115.9 g of dichlorophosphazene oligomers (a mixture of 58.57% of trimer, 12.26% of tetramer, 11.11% of pentamer and hexamer, 2.82% of heptamer and 12.04% of octamer and higher oiligomers). Then a 10% toluene solution of 0.15 mole (18.3 g) of dilithium salt of hydroquinone separately prepared was added dropwise to the reaction mixture with stirring. After completion of addition, the reaction was conducted with stirring at 50° C. for 5 hours. Then about 1200 g of 20% toluene solution of sodium phenolate prepared above was added dropwise to the reaction mixture with stirring and the reaction was conducted with stirring at 100° C. for 8 hours.

After the reaction was completed, the reaction mixture was concentrated and added with stirring to 3 liters of mixed solvent (water/methanol at 1/1 volume ratio). The mixture was neutralized with diluted sulfuric acid and filtered. The filtrate was washed twice with 3 liters of mixed solvent (water/methanol at 1/1 volume ratio), filtered, and vacuum-dried with heating at 80° C. under pressure of 20 mmHg for 11 hours, giving 220 g of fine yellow particles.

The above-obtained crosslinked phenoxyphosphazene compound did not show a definite melting point, and had a decomposition starting temperature of 305° C. as determined by TG/DTA analysis. The crosslinked phenoxyphosphazene compound had an approximate composition $$[N{=}P(\text{—O-}p\text{-Ph—O—})_{0.15}(\text{—O—Ph})_{1.7}]$$

which was determined based on the phosphorus content and CHN elemental analysis data.

The quantity of free hydroxyl groups in the above-obtained crosslinked phenoxyphosphazene compound was determined by the actylation method. The quantity of free hydroxyl groups in the above-obtained crosslinked phenoxyphosphazene compound was $0.2 \times 10^{-3}$ equivalents/g, as hydroxyl equivalent per gram of the sample. The compound had hydroxyl groups in the molecule.

Comparative Synthesis Example 2

A phenoxyphosphazene compound having 2,2-bis(p-oxyphenyl)propane-crosslinked structure was prepared according to Synthesis Example 2 described in Japanese Unexamined Patent Publication No. 181429/1999.

86.7 g (0.38 mole) of bisphenol-A and 460 ml of tetrahydrofuran (THF) were placed into a 2-liter, 4-necked flask. While maintaining the internal temperature at 19° C. with stirring, 3.5 g (0.5 mole) of metallic Li in the form of cut pieces was added thereto with stirring. After completion of the addition, the mixture was heated to 61° C. over one hour and stirring was continued for 4 hours at 61 to 68° C. After the reaction was completed, the lithium salt of bisphenol-A of the reaction mixture became a white slurry.

215.6 g (2.25 moles) of phenol and 500 ml of toluene were placed in a 3-liter, 4-necked flask. While maintaining the internal temperature at 25° C. with stirring, 34.5 g (1.5 moles) of metallic sodium in the form of cut pieces was added thereto. After completion of the addition, the mixture was heated to 77° C. over 4 hours, and stirring was continued for 3 hours at 77 to 113° C. After the reaction was completed, the sodium phenolate of the reaction mixture became a white slurry.

A 5-liter, 4-necked flask was charged with 313.13 g (1.0 mole) of dichlorophosphazene oligomers (conc. 37.01%, monochlorobenezene solution, 58.57% of trimer, 12.26% of tetramer, 11.11% of pentamer and hexamer, 2.82% of heptamer and 12.04% of octamer and higher oiligomers). Then, while maintaining the internal temperature at 20° C. with stirring, a solution containing a lithium salt of bisphenol-A was added dropwise to the oligomers with stirring over 1 hour. The contents became a pale yellow milky product. While maintaining the internal temperature at 20° C. with stirring, a sodium phenolate solution was added dropwise over 1 hour. The contents became a brown slurry. After completion of the addition, stirring was continued for 13 hours at 47° C. The mixture became a pale brown slury.

After the reaction was completed, the reaction mixture was concentrated. The concentrate was washed three times with 3 liters of 2%NaOH, filtered, washed three times with 3 liters of mixed solvent (water/methanol at 1/1 volume ratio), filtered, and vacuum-dried with heating at 80° C. under pressure of 20 mmHg for 11 hours, giving a white powder (208.67 g) in a yield of 86.50% relative to dichlorophosphazene.

The obtained compound had a hydrolyzable chlorine content of 0.93%, a decomposition temperature of 296.0° C. and 5% weight loss temperature of 307.7° C., and showed an approximate composition $$[N{=}P(\text{—O—Ph—C(CH}_3)_2\text{—Ph—O—})_{0.25}(\text{—O—Ph})_{1.50}]$$

which was determined based on the phosphorus content and CHN elemental analysis data.

Further the quantity of free hydroxyl groups in the above-obtained crosslinked phenoxyphosphazene compound was determined by the acetylation method. The quantity of free hydroxyl groups in the above-obtained crosslinked phenoxyphosphazene compound was $0.2 \times 10^{-3}$ equivalents/g, as hydroxyl equivalent per gram of the sample. The compound had hydroxyl groups in the molecule.

Synthesis Example 4

Synthesis of Aromatic Polyamide Having Repeating Units of [—HN-p-Ph—CH$_2$-p-Ph—NH—OC—(CH$_2$)$_8$—CO—]

In an autoclave equipped with a nitrogen inlet tube and a cock for reduction of pressure, a mixture of 991 g (5.0 moles) of 4,4'-diaminodiphenylmethane and 1062 g (5.25 moles) of sebacic acid was heated to 285° C. in a nitrogen stream to fuse the mixture. The internal pressure in the autoclave was reduced to 1333 Pa. After the mixture was held in a molten state for 1 hour, the mixture was cooled to an ordinary pressure and ordinary temperature in a nitrogen stream, giving the contemplated aromatic polyamide.

The obtained aromatic polyamide had an intrinsic viscosity of 0.70 to 0.92 dl/g (concentration of 0.5 g/dl in N,N-dimethylacetamide containing 5% lithium chloride, as measured at 30° C.).

Synthesis Example 5

Synthesis of Aromatic Polyamide Having Repeating Units of [—HN—(CH$_2$)$_6$—NH—OC-p-Ph—CO—]

The same procedure as in Synthesis Example 4 was conducted with the exception of using hexamethylenediamine in place of 4,4'-diaminodiphenylmethane in the same molar amount and using terephthalic acid in place of sebacic acid in the same molar amount, thereby producing the desired aromatic polyamide.

The obtained aromatic polyamide had an intrinsic viscosity of 0.69 to 0.87 dl/g (concentration of 0.5 g/dl in N,N-dimethylacetamide containing 5% lithium chloride, as measured at 30° C.).

Synthesis Example 6

Synthesis of Aromatic Polyamide Having Repeating Units of [—HN—$(CH_2)_6$—NH—OC-m-Ph—CO—])

The same procedure as in Synthesis Example 5 was conducted with the exception of using isophthalic acid instead of terephthalic acid in an amount of the same mole as the latter, thereby producing the desired aromatic polyamide.

The obtained aromatic polyamide had an intrinsic viscosity of 0.65 to 0.84 dl/g (concentration of 0.5 g/dl in N,N-dimethylacetamide containing 5% lithium chloride, as measured at 30° C.).

Synthesis Example 7

Synthesis of Aromatic Polyamide Having Repeating Units of [(—OC-p-Ph—NH—)$_{0.6}$(—OC-m-Ph—COO—$(CH_2)_2$—O—)$_{0.41}$]

A mixture of 895 g (5.0 moles) of p-acetamidebenzoic acid and 640 g (3.33 moles) of poly(ethylene isophthalate) (intrinsic viscosity 0.56) was crushed into particles of 20 mesh or less. The obtained particles were placed into an autoclave equipped with a cock for reduction of pressure, and were heated under reduced pressure of 13.3 Pa, at 180° C. for 1 hour, at 220° C. for 3 hours, and at 230° C. for 10 hours, and cooled to room temperature, giving the desired aromatic polyamide.

The obtained aromatic polyamide had an intrinsic viscosity of 0.57 to 0.68 dl/g (concentration of 0.5 g/dl in a mixed solvent, phenol/tetrachloroethane=60/40 (v/v) as measured at 25° C.).

EXAMPLE 1

100 parts of the aromatic polyamide resin prepared in Synthesis Example 4 was dried at 120° C. for 12 hours by a hot air circulating type drier (Perfect Oven Original-PH200, product of Tabai Especk Co., Ltd.). Ten parts of an inorganic fibrous substance and 10 parts of magnesium hydroxide were mixed therewith. The mixture was supplied to a twin-screw extruder (trade name S1-KRC, 25 mm kneader, product of Kurimoto, Ltd.) from a powder supplier (trade name Accurate-Model-100, product of Kurama Engineering Co., Ltd.), and was kneaded and fused at a screw temperature of 240 to 270° C. 15 or 20 parts of a flame retardant (crosslinked phosphazene compound) was added from a middle portion of the screw and further kneaded and fused. The obtained melt was supplied to a pelletizer (trade name Model-C-3, product of Enpura Sangyo Co., Ltd.), and 12 kinds of pellets of the flame-retardant aromatic polyamide resin compositions of the invention were produced. Their specific composition is shown in Table 1.

The crosslinked phosphazene compounds prepared in Synthesis Examples 1 to 3 were used as the crosslinked phosphazene compound. The following were used as the inorganic fibrous substance and magnesium hydroxide:

Fibrous potassium titanate: trade name "TISMO N-102", product of Otsuka Chemical Co., Ltd., average fiber diameter 0.4 $\mu$m, average fiber length 15 $\mu$m, aspect ratio 10 or more, pH 9.5 (hereinafter referred to as "TISMO").

Fibrous calcium silicate: trade name "BISTAL", product of Otsuka Chemical Co., Ltd., average fiber diameter 0.4 $\mu$m, average fiber length 28 $\mu$m, aspect ratio 7 or more, pH 9.5 (hereinafter referred to as "WN").

Fibrous magnesium borate: trade name "PGM", product of Otsuka Chemical Co., Ltd., average fiber diameter 0.4 $\mu$m, average fiber length 15 $\mu$m, aspect ratio 10 or more, pH 9.0 (hereinafter referred to as "PGM").

Magnesium hydroxide: trade name "KISUMA 120", product of Kyowa Kagaku Kogyo Co., Ltd., volatile content (120° C., 1 hour) 0.1%, average particle size 1.0 $\mu$m, specific surface area (BET method) 5 m$^2$/g, particle surface uncoated.

Comparative Example 1

Five kinds of pellets of aromatic polyamide resin compositions were produced in the same manner as in Example 1 with the exception of either not using an inorganic fibrous substance or magnesium hydroxide, or using resorcinol-bis (diphenyl phosphate) prepared in Reference Example 1 in place of crosslinked phosphazene compound. The specific composition is shown in Table 1.

TABLE 1

| No. | Aromatic Polyamide (amount, part) | Flame Retardant (amount, part) | Inorganic fibrous Substance (amount, part) | Magnesium Hydroxide (amount, part) |
|---|---|---|---|---|
| Ex. 1 | | | | |
| 1 | Syn. Ex. 4 (100) | Syn. Ex. 1 (20) | TISMO (10) | 10 |
| 2 | Syn. Ex. 4 (100) | Syn. Ex. 1 (15) | TISMO (10) | 10 |
| 3 | Syn. Ex. 4 (100) | Syn. Ex. 2 (20) | TISMO (10) | 10 |
| 4 | Syn. Ex. 4 (100) | Syn. Ex. 3 (20) | TISMO (10) | 10 |
| 5 | Syn. Ex. 4 (100) | Syn. Ex. 1 (20) | WN (10) | 10 |
| 6 | Syn. Ex. 4 (100) | Syn. Ex. 2 (20) | WN (10) | 10 |
| 7 | Syn. Ex. 4 (100) | Syn. Ex. 2 (15) | WN (10) | 10 |
| 8 | Syn. Ex. 4 (100) | Syn. Ex. 3 (20) | WN (10) | 10 |
| 9 | Syn. Ex. 4 (100) | Syn. Ex. 1 (20) | PGM (10) | 10 |
| 10 | Syn. Ex. 4 (100) | Syn. Ex. 2 (20) | PGM (10) | 10 |
| 11 | Syn. Ex. 4 (100) | Syn. Ex. 3 (20) | PGM (10) | 10 |
| 12 | Syn. Ex. 4 (100) | Syn. Ex. 3 (15) | PGM (10) | 10 |

TABLE 1-continued

| No. | Aromatic Polyamide (amount, part) | Flame Retardant (amount, part) | Inorganic fibrous Substance (amount, part) | Magnesium Hydroxide (amount, part) |
|---|---|---|---|---|
| Comp. Ex. 1 | | | | |
| 1 | Syn. Ex. 4 (100) | Syn. Ex. 1 (20) | — | 10 |
| 2 | Syn. Ex. 4 (100) | Syn. Ex. 1 (20) | WN (10) | 0 |
| 3 | Syn. Ex. 4 (100) | Ref. Ex. 1 (20) | TISMO (10) | 10 |
| 4 | Syn. Ex. 4 (100) | Ref. Ex. 1 (20) | WN (10) | 10 |
| 5 | Syn. Ex. 4 (100) | Ref. Ex. 1 (20) | PGM (10) | 10 |

Ex. = Example,
Comp. Ex. = Comparative Example,
Syn. = Synthesis,
Ref. = Reference

EXAMPLES 2 TO 4

Twelve kinds of pellets of the flame-retardant polyamide resin compositions of the invention in each example were prepared in the same manner as in Example 1 except that in place of the aromatic polyamide prepared in Synthesis Example 4, the aromatic polyamide prepared in Synthesis Example 5 was used (Example 2), the aromatic polyamide prepared in Synthesis Example 6 was used (Example 3), and the aromatic polyamide prepared in Synthesis Example 7 was used (Example 4).

Comparative Examples 2 to 4

Five kinds of pellets of polyamide resin compositions in each comparative example were prepared in the same manner as in Comparative Example 1 except that in place of the aromatic polyamide prepared in Synthesis Example 4, the aromatic polyamide prepared in Synthesis Example 5 was used (Comparative Example 2), the aromatic polyamide prepared in Synthesis Example 6 was used (Comparative Example 3), and the aromatic polyamide prepared in Synthesis Example 7 was used (Comparative Example 4).

Test Example 1

The pellets of polyamide resin compositions prepared in Examples 1 to 4 and Comparative Examples 1 to 4 were subjected to the following tests.

1. Flame Retardancy Test

An evaluation test was carried out based on UL-94 Test Method (Test for Flammability of Plastic Materials for Parts in Devices and Appliances UL94, Fourth Edition) using test pieces 1/16 inches in thickness, 5 inches in length, and 0.5 inch in width (under the same conditions as described below in Processability in item 5). The evaluation criteria are as follows.

V-0: The resin composition can meet all of conditions (A) to (E) described below.

(A) Any of test pieces (5 test pieces in each set) showed flaming (burning in flames) for 10 seconds or less after it was ignited.

(B) Five test pieces in each set were each ignited twice. Namely each set of test pieces was ignited a total of 10 times. A total of flaming periods was less than 50 seconds.

(C) No test piece in each set (5 test pieces in each set) flamed up to the clamp.

(D) No test piece in each set (5 test pieces in each set) dropped flaming particles which would ignite cotton 305 mm below.

(E) Any of test pieces (5 test pieces in each set) showed glowing (not burning in flames but remaining as red live charcoal) for 30 seconds or less after the second ignition.

V-1: The resin composition can meet all of conditions (A) to (E) described below.

(A) Any of test pieces (5 test pieces in each set) showed flaming for 30 seconds or less after it was ignited.

(B) Five test pieces in each set were each ignited twice. Namely each set of test pieces was ignited a total of 10 times. A total of flaming periods was less than 250 seconds.

(C) and (D) The same as in V-0

(E) Any of test pieces (5 test pieces in each set) showed glowing for 60 seconds or less after the second ignition. V-2: The resin composition can meet all of conditions (A) to (E) described below.

(A)(B)(C)(E) The same as in V-1

(D) One or more test pieces in each set of 5 test pieces dropped flaming particles which would ignite cotton 305 mm below.

HB: No test piece in a set of three test pieces burned forward to a standard line 101.6 mm away after ignition.

2. Average Burning Time

A total of flaming periods is divided by 10 in view of a total of 10 times ignition (twice ignition by each test piece in a set of 5 test pieces) to give an average burning time.

3. Occurrence or Non-occurrence of Dripping

In the flame retardancy test of item 1, it was visually inspected whether flaming particles (dripping) which would ignite cotton existed or not.

4. State of Kneaded Melt When Forced Out

The flame-retardant aromatic polyamide resin composition was observed when forced out as kneaded melt and was evaluated according to the following criteria.

Good: The strands were stable and retained their constant thickness when withdrawn.

Improper: The strands were instable and became varied in thickness when withdrawn. They were easily bent and sometimes broken.

5. Processability

Pellets of flame-retardant aromatic polyamide resin composition were dried at 120° C. for 12 hours in a hot air circulating type drier, and was injection-molded by an injection molding machine (trade name MINIMAT-26/15B, product of Sumitomo Heavy Industries, Ltd.) at a cylinder temperature of 220 to 280° C., and a mold temperature of 50 to 90° C. to produce test pieces for use in the flame retardancy test 1. The injection molding was observed and evaluated according to the following criteria.

Good: The pellets can be easily supplied and the obtained test pieces have a stably smooth surface.

Improper: The pellets easily slip on the supply screw, and the surface of the obtained test pieces is rough-surfaced.

6. Color The color was visually evaluated based on the resin containing no additive.

The results are shown in Tables 2 to 5.

TABLE 2

| | Flame Retardancy | | | Molding Processability | | |
|---|---|---|---|---|---|---|
| No. | Flame retardancy | Average burning time (sec) | Occurrence of dripping | Kneaded extruded state | Processability of test piece | Color of test piece |
| Ex. 1 | | | | | | |
| 1 | V-0 | 2.0 | None | Good | Good | P-y white |
| 2 | V-0 | 5.1 | None | Good | Good | P-y white |
| 3 | V-0 | 4.0 | None | Good | Good | P-y white |
| 4 | V-0 | 3.1 | None | Good | Good | Gray |
| 5 | V-0 | 5.0 | None | Good | Good | Gray |
| 6 | V-0 | 3.6 | None | Good | Good | Gray |
| 7 | V-0 | 8.1 | None | Good | Good | P-y white |
| 8 | V-0 | 4.4 | None | Good | Good | P-y white |
| 9 | V-0 | 1.0 | None | Good | Good | P-y white |
| 10 | V-0 | 1.5 | None | Good | Good | P-y white |
| 11 | V-0 | 1.0 | None | Good | Good | P-y white |
| 12 | V-0 | 7.7 | None | Good | Good | P-y white |
| Comp. Ex. 1 | | | | | | |
| 1 | HB | — | Dripped | Improper | Improper | Gray |
| 2 | HB | — | Dripped | Improper | Improper | Gray |
| 3 | V-2 | 8.2 | Dripped | Improper | Improper | Gray |
| 4 | V-2 | 6.9 | Dripped | Improper | Improper | Gray |
| 5 | V-2 | 11.0 | Dripped | Improper | Improper | Gray |

Note:
P-y white: (pale yellowish white color)

TABLE 3

| | Flame Retardancy | | | Molding Processability | | |
|---|---|---|---|---|---|---|
| No. | Flame retardancy | Average burning time (sec) | Occurrence of dripping | Kneaded extruded state | Processability of test piece | Color of test piece |
| Ex. 2 | | | | | | |
| 1 | V-0 | 5.0 | None | Good | Good | Gray |
| 2 | V-0 | 6.3 | None | Good | Good | P-y white |
| 3 | V-0 | 1.0 | None | Good | Good | P-y white |
| 4 | V-0 | 1.5 | None | Good | Good | P-y white |
| 5 | V-0 | 4.0 | None | Good | Good | P-y white |
| 6 | V-0 | 3.6 | None | Good | Good | Gray |
| 7 | V-0 | 5.9 | None | Good | Good | P-y white |
| 8 | V-0 | 4.4 | None | Good | Good | Gray |
| 9 | V-0 | 1.0 | None | Good | Good | P-y white |
| 10 | V-0 | 1.5 | None | Good | Good | P-y white |
| 11 | V-0 | 1.9 | None | Good | Good | P-y white |
| 12 | V-0 | 9.5 | None | Good | Good | P-y white |
| Comp. Ex. 2 | | | | | | |
| 1 | HB | — | Dripped | Improper | Improper | Gray |
| 2 | V-2 | 19.2 | Dripped | Improper | Improper | Gray |
| 3 | V-2 | 9.9 | Dripped | Improper | Improper | Gray |
| 4 | V-2 | 7.0 | Dripped | Improper | Improper | Gray |
| 5 | V-2 | 18.5 | Dripped | Improper | Improper | Gray |

Note:
P-y white: (pale yellowish white color)

TABLE 4

| No. | Flame Retardancy | | | Molding Processability | | |
|---|---|---|---|---|---|---|
| | Flame retardancy | Average burning time (sec) | Occurrence of dripping | Kneaded extruded state | Processability of test piece | Color of test piece |
| Ex. 3 | | | | | | |
| 1 | V-0 | 3.6 | None | Good | Good | P-y white |
| 2 | V-0 | 6.4 | None | Good | Good | Gray |
| 3 | V-0 | 4.9 | None | Good | Good | P-y white |
| 4 | V-0 | 2.4 | None | Good | Good | Gray |
| 5 | V-0 | 5.1 | None | Good | Good | Gray |
| 6 | V-0 | 3.3 | None | Good | Good | Gray |
| 7 | V-0 | 8.0 | None | Good | Good | Gray |
| 8 | V-0 | 4.1 | None | Good | Good | Gray |
| 9 | V-0 | 2.2 | None | Good | Good | Gray |
| 10 | V-0 | 3.0 | None | Good | Good | Gray |
| 11 | V-0 | 2.1 | None | Good | Good | P-y white |
| 12 | V-0 | 9.1 | None | Good | Good | P-y white |
| Comp. Ex. 3 | | | | | | |
| 1 | HB | — | Dripped | Improper | Improper | Gray |
| 2 | V-2 | 15.0 | Dripped | Improper | Improper | Gray |
| 3 | V-2 | 12.3 | Dripped | Improper | Improper | Gray |
| 4 | V-2 | 10.1 | Dripped | Improper | Improper | Gray |
| 5 | V-2 | 13.2 | Dripped | Improper | Improper | Gray |

Note:
P-y white: (pale yellowish white color)

TABLE 5

| No. | Flame Retardancy | | | Molding Processability | | |
|---|---|---|---|---|---|---|
| | Flame retardancy | Average burning time (sec) | Occurrence of dripping | Kneaded extruded state | Processability of test piece | Color of test piece |
| Ex. 4 | | | | | | |
| 1 | V-0 | 2.8 | None | Good | Good | P-y white |
| 2 | V-0 | 8.1 | None | Good | Good | P-y white |
| 3 | V-0 | 3.5 | None | Good | Good | P-y white |
| 4 | V-0 | 6.0 | None | Good | Good | P-y white |
| 5 | V-0 | 4.9 | None | Good | Good | P-y white |
| 6 | V-0 | 3.7 | None | Good | Good | Gray |
| 7 | V-0 | 7.4 | None | Good | Good | P-y white |
| 8 | V-0 | 5.1 | None | Good | Good | Gray |
| 9 | V-0 | 2.1 | None | Good | Good | Gray |
| 10 | V-0 | 1.6 | None | Good | Good | Gray |
| 11 | V-0 | 1.2 | None | Good | Good | P-y white |
| 12 | V-0 | 6.0 | None | Good | Good | P-y white |
| Comp. Ex. 4 | | | | | | |
| 1 | HB | — | Dripped | Improper | Improper | Gray |
| 2 | HB | — | Dripped | Improper | Improper | Gray |
| 3 | V-2 | 9.0 | Dripped | Improper | Improper | Gray |
| 4 | V-2 | 7.6 | Dripped | Improper | Improper | Gray |
| 5 | V-2 | 18.8 | Dripped | Improper | Improper | Gray |

Note:
P-y white: (pale yellowish white color)

The aromatic polyamide resin moldings containing the specific crosslinked phosphazene compound (b) of the present invention were excellent in flame retardancy compared with the aromatic polyamide resin moldings containing the crosslinked phosphazene compound disclosed in Japanese Unexamined Patent Publication No. 181429/1999. Further the aromatic polyamide resin moldings containing the specific crosslinked phosphazene compound (b) of the present invention were superior in mechanical properties to the aromatic polyamide resin moldings containing the crosslinked phosphazene compound disclosed in Japanese Unexamined Patent Publication No. 181429/1999. These facts are clarified from the flame retardancy test and the mechanical performance test described below.

Flame Retardancy Test and Mechanical Performance Test (1) Crosslinked Phenoxyphosphazene Compound The crosslinked phenoxyphosphazene compounds used herein include the crosslinked phenoxyphosphazene compound prepared in Synthesis Example 1 (hereinafter referred to as "flame retardant A"), the crosslinked phenoxyphosphazene compound prepared in Synthesis Example 2 (hereinafter referred to as "flame retardant B"), the crosslinked phenoxyphosphazene compound prepared in Comparative Synthesis Example 1 (Synthesis Example 1 of Japanese Unexamined Patent Publication No. 181429/1999) (hereinafter referred to as "flame retardant a"), and the crosslinked phenoxyphosphazene compound prepared in Comparative Synthesis Example 2 (Synthesis Example 2 of Japanese Unexamined Patent Publication No. 181429/1999) (hereinafter referred to as "flame retardant b").

(2) Pellets of Flame-retardant Resin Composition

The aromatic polyamide resin prepared in Synthesis Example 4 of the instant specification was used as the aromatic polyamide resin.

Fibrous potassium titanate and fibrous calcium silicate were used as the inorganic fibrous substance.

Fibrous potassium titanate: trade name "TISMO N-102", product of Otsuka Chemical Co., Ltd., average fiber diameter 0.4 μm, average fiber length 15 μm, aspect ratio 10 or more, pH 9.5 (hereinafter referred to as "TISMO").

Fibrous calcium silicate: trade name "BISTAL", product of Otsuka Chemical Co., Ltd., average fiber diameter 0.4 μm, average fiber length 28 μm, aspect ratio 7 or more, pH 9.5 (hereinafter referred to as "WN").

Four types of pellets of resin composition comprising the following components were prepared.

(1) 100 parts by weight of aromatic polyamide resin was dried at 120° C. for 12 hours by a hot air circulating type drier (Perfect Oven Original-PH200, product of Tabai Especk Co., Ltd.). Ten parts by weight of TISMO and 10 parts by weight of magnesium hydroxide were mixed therewith. The mixture was supplied to a twin-screw extruder (trade name S1-KRC, 25 mm kneader, product of Kurimoto, Ltd.) from a powder supplier (trade name Accurate-Model-100, product of Kurama Engineering Co., Ltd.), and was kneaded and fused at a screw temperature of 240 to 270° C. 20 parts by weight of flame retardant A was added from a middle portion of the screw and kneaded and fused. The obtained melt was supplied to a pelletizer (trade name Model—C-3, product of Enpura Sangyo Co., Ltd.), whereby pellets of aromatic polyamide resin composition (hereinafter referred to as "pellet A") were produced.

(2) Pellets of aromatic polyamide resin composition (hereinafter referred to as "pellet a") were produced in the same manner as in (1) with the exception of using 20 parts by weight of flame retardant a in place of flame retardant A.

(3) Pellets of aromatic polyamide resin composition (hereinafter referred to as "pellet B") were produced in the same manner as in (1) with the exception of using 10 parts by weight of WN in place of TISMO and 20 parts by weight of flame retardant B in place of flame retardant A.

(4) Pellets of aromatic polyamide resin composition (hereinafter referred to as "pellet b") were produced in the same manner as in (1) with the exception of using 10 parts by weight of WN in place of TISMO and 20 parts by weight of flame retardant b in place of flame retardant A.

(3) Flame Retardancy and Mechanical Properties of Pellets

The above-obtained pellets A, pellets a, pellets B and pellets b were checked to evaluate the flame retardancy, average burning time and occurrence or non-occurrence of dripping. The test methods used are the same as those used in Test Example 1. Test pieces were produced by injection-molding 4 kinds of pellets using an injection molding machine (trade name MINIMAT-26/15B, product of Sumitomo Heavy Industries, Ltd.) at a cylinder temperature of 220 to 280° C., and mold temperature of 50 to 90° C. to measure the IZOD impact strength, tensile strength and bending strength.

IZOD impact strength: Measured at 23° C. using an IZOD impact tester (product of Toyo Seiki Co., Ltd.) according to JIS—K7110

Tensile strength: Measured at 23° C. using Shimadzu Autograph DSC-2000 (product of Shimadzu Corp., Ltd.) according to JIS—K7113

Bending strength: Measured at 23° C. using Shimadzu Autograph DSC-5000A (product of Shimadzu Corp., Ltd.) according to JIS—K7116

The results are shown below in Table 6.

The above-obtained pellets A, pellets a, pellets B and pellets b were heated in the atmosphere of air at 150° C. for 720 hours and were checked to assess the flame retardancy, average burning time and occurrence or non-occurrence of dripping in the same manner as above. Test pieces prepared by the same method as above were provided to measure the IZOD impact strength, tensile strength and bending strength.

The results are shown in Table 6.

TABLE 6

| Flame Retardant | Free Hydroxyl group | Flame Retardant Property | | | Mechanical Properties | | |
|---|---|---|---|---|---|---|---|
| | | Flame retardancy | Average burning time (sec) | Occurrence of dripping | IZOD (J/M) | Tensile strength (MPa) | Bending strength (MPa) |
| Before heating | | | | | Before Heating | | |
| Flame retardant A | None | V-0 | 2.0 | None | 60 | 80 | 100 |
| | | | | | 57 | 81 | 95 |
| Flame retardant B | None | V-0 | 3.6 | None | 55 | 77 | 89 |
| | | | | | 52 | 79 | 90 |
| Flame retardant a | Existing | V-0 | 6.1 | None | After Heating | | |
| Flame retardant b | Existing | V-0 | 5.7 | None | 53 | 79 | 99 |
| | | | | | 54 | 78 | 92 |
| After | | | | | 39 | 61 | 70 |

TABLE 6-continued

| | Flame Retardant Property | | | | Mechanical Properties | | |
|---|---|---|---|---|---|---|---|
| | Free | Average | | | | | |
| Flame Retardant | Hydroxyl group | Flame retardancy | burning time (sec) | Occurrence of dripping | IZOD (J/M) | Tensile strength (MPa) | Bending strength (MPa) |
| heating | | | | | 41 | 55 | 67 |
| Flame retardant A | None | V-0 | 8.3 | None | | | |
| Flame retardant B | None | V-0 | 7.8 | None | | | |
| Flame retardant a | Existing | V-1 | 23.0 | None | | | |
| Flame retardant b | Existing | V-1 | 19.9 | None | | | |

The results in Table 6 show that the polyamide resin moldings containing the crosslinked phenoxyphosphazene compound according to the present invention are excellent in flame retardancy and mechanical properties compared with the polyamide resin moldings containing the crosslinked phenoxyphosphazene compound disclosed in Japanese Unexamined Patent Publication No. 181429/1999. For example, when the polyamide resin composition is heated for a long time, the polyamide resin moldings containing the crosslinked phenoxyphosphazene compound disclosed in Japanese Unexamined Patent Publication No. 181429/1999 are markedly lowered in flame retardancy and mechanical properties. It is clear from this fact that the polyamide resin moldings containing the the crosslinked phenoxyphosphazene compound of the present invention are superior in flame retardancy. This supports that even when the aromatic polyamide resin composition of the invention is used even after a long term storage at a high temperature, the objects of the invention can be achieved.

Effects of the Invention

The flame-retardant aromatic polyamide resin composition of the invention has various advantages as described below.

(1) The flame-retardant aromatic polyamide resin composition of the invention is free of a halogen compound and, therefore, neither generates hydrogen halide due to heat decomposition of halogen compound during molding of the resin nor gives rise to corrosion of the mold or deterioration and discoloration of the resin.

(2) The flame-retardant aromatic polyamide resin moldings of the invention when burnt would not give off gases or smoke of hydrogen halide which are harmful to organisms.

(3) The flame-retardant aromatic polyamide resin composition and moldings of the invention have high flame retardancy corresponding to V-0 in UL Standard.

(4) The flame-retardant aromatic polyamide resin moldings of the invention when burnt would not drip a molten resin. That is, the flame-retardant aromatic polyamide resin moldings of the invention have a property of preventing dripping of a molten resin when burnt.

(5) The flame-retardant aromatic polyamide resin moldings of the invention retain the desirable properties such as mechanical properties and molding processability inherently owned by aromatic polyamide resin without deteriorating them.

(6) The flame-retardant aromatic polyamide resin composition of the invention can impart excellent flame retardancy and mechanical properties to the moldings molded from the composition even after the composition has been stored for a long term.

What is claimed is:

1. A flame-retardant aromatic polyamide resin composition comprising:

(a) 100 parts by weight of an aromatic polyamide resin, (b) 0.1 to 100 parts by weight of a crosslinked phosphazene compound, (c) 1 to 60 parts by weight of an inorganic fibrous substance and (d) 1 to 60 parts by weight of magnesium hydroxide,
wherein the crosslinked phosphazene compound (b) is a crosslinked compound obtained by crosslinking at least one phosphazene compound selected from the group consisting of a cyclic phenoxyphosphazene compound represented by the formula (1)

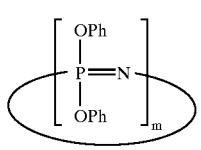

(1)

wherein m is an integer of 3 to 25 and Ph is a phenyl group and a linear phenoxyphosphazene compound represented by the formula (2)

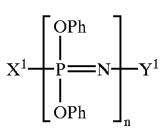

(2)

wherein $X^1$ represents a group —N=P(OPh)$_3$ or a group
—N=P(O)OPh, $Y^1$ represents a group —P(OPh)$_4$ or a group
—P(O)(OPh)$_2$, n is an integer of 3 to 10000 and Ph is as defined above, with at least one crosslinking group selected from the class consisting of o-phenylene group, m-phenylene group, p-phenylene group and bisphenylene group represented by the formula (3)

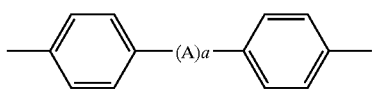
(3)

wherein A is —C(CH$_3$)$_2$—, —SO$_2$—, —S— or —O— and a is 0 or 1;
wherein
(i) each of the crosslinking groups is interposed between the two oxygen atoms left after the elimination of phenyl groups from the phosphazene compound;
(ii) the amount of the phenyl groups in the crosslinked compound is 50 to 99.9% based on the total amount of all phenyl groups in the phenoxyphosphazene compound represented by the formula (1) and/or the phenoxyphosphazene compound represented by the formula (2); and
(iii) the crosslinked phosphazene compound has no free hydroxyl group in the molecule.

2. The flame-retardant aromatic polyamide resin composition according to claim 1, wherein the aromatic polyamide resin as the component (a) is a polyamide resin which contains in the main chain, as repeating units, a group comprising at least one species of bivalent residue selected from the class consisting of bivalent aromatic cyclic residues and bivalent heterocyclic residues which is bonded to an amide residue (—CONH—).

3. The flame-retardant aromatic polyamide resin composition according to claim 2, wherein the bivalent aromatic cyclic residue is at least one species selected from the class consisting of phenylene, alkylene phenylene, dialkylene phenylene, biphenylene, a group represented by the formula

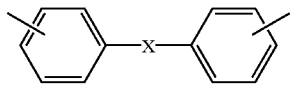

wherein X is alkylene group having 1 to 5 carbon atoms, oxygen atom, sulfur atom, a group —CO— or a group —SO$_2$—, and naphthalene group, and wherein at least one substituent selected from the class consisting of nitro, hydroxy, carboxy and alkoxy may be present on the aromatic ring.

4. The flame-retardant aromatic polyamide resin composition according to claim 2, wherein the bivalent heterocyclic residue is at least one species selected from the class consisting of bivalent thiazole residue and bivalent benzoimidazole residue and wherein at least one substituent selected from the class consisting of nitro, hydroxy, carboxy and alkoxy may be present on the heterocyclic ring.

5. The flame-retardant aromatic polyamide resin composition according to claim 1, wherein the aromatic polyamide resin is at least one species selected from the group consisting of polyamide MXD6 resins, modified nylon 6T resins, polyphenylene isophthalamide, polyphenylene terephthalamide, polybenzamide, polyamideimide, polyamide ester, polyamide hydrazide, polysulfonamide, polyamideimide ester, polyamidebenzimidazole and polythiazoleamide.

6. The flame-retardant aromatic polyamide resin composition according to claim 1, wherein the crosslinked phosphazene compound as the component (b) contains 70 to 90% of phenyl groups, based on the total amount of all phenyl groups in the phosphazene compound of the formula (1) and/or the phosphazene compound of the formula (2).

7. The flame-retardant aromatic polyamide resin composition according to claim 1, wherein the inorganic fibrous substance as the component (c) is at least one species selected from the group consisting of fibrous alkali metal titanate, fibrous transition metal borate, fibrous alkaline earth metal borate, fibrous zinc oxide, fibrous titanium oxide, fibrous magnesium oxide, fibrous gypsum, fibrous aluminum silicate, fibrous calcium silicate, fibrous silicon carbide, fibrous titanium carbide, fibrous silicon nitride, fibrous titanium nitride, carbon fibers, alumina fibers, alumina-silica fibers, zirconia fibers, glass fibers and quartz fibers.

8. The flame-retardant aromatic polyamide resin composition according to claim 1, wherein the magnesium hydroxide as the component (d) is one which contains 0.01 to 1 wt % of volatiles when heated at 120° C. for 1 hour and which has an average particle size of 0.1 to 100 μm, and a specific surface area (as determined by the BET method) of 0.1 to 500 m$^2$/g.

9. The flame-retardant aromatic polyamide resin composition according to claim 1 which comprises (a) 100 parts by weight of an aromatic polyamide resin, (b) 1 to 40 parts by weight of a crosslinked phosphazene compound, (c) 5 to 40 parts by weight of an inorganic fibrous substance and (d) 5 to 40 parts by weight of magnesium hydroxide.

10. Flame-retardant aromatic polyamide resin moldings prepared by molding the flame-retardant aromatic polyamide resin composition as defined in any of claims 1 to 9.

* * * * *